March 20, 1934.   H. C. HAYES   1,951,358
VIBRATION DETECTOR
Filed May 17, 1928   3 Sheets-Sheet 1

Inventor
Harvey C. Hayes
By Attorney

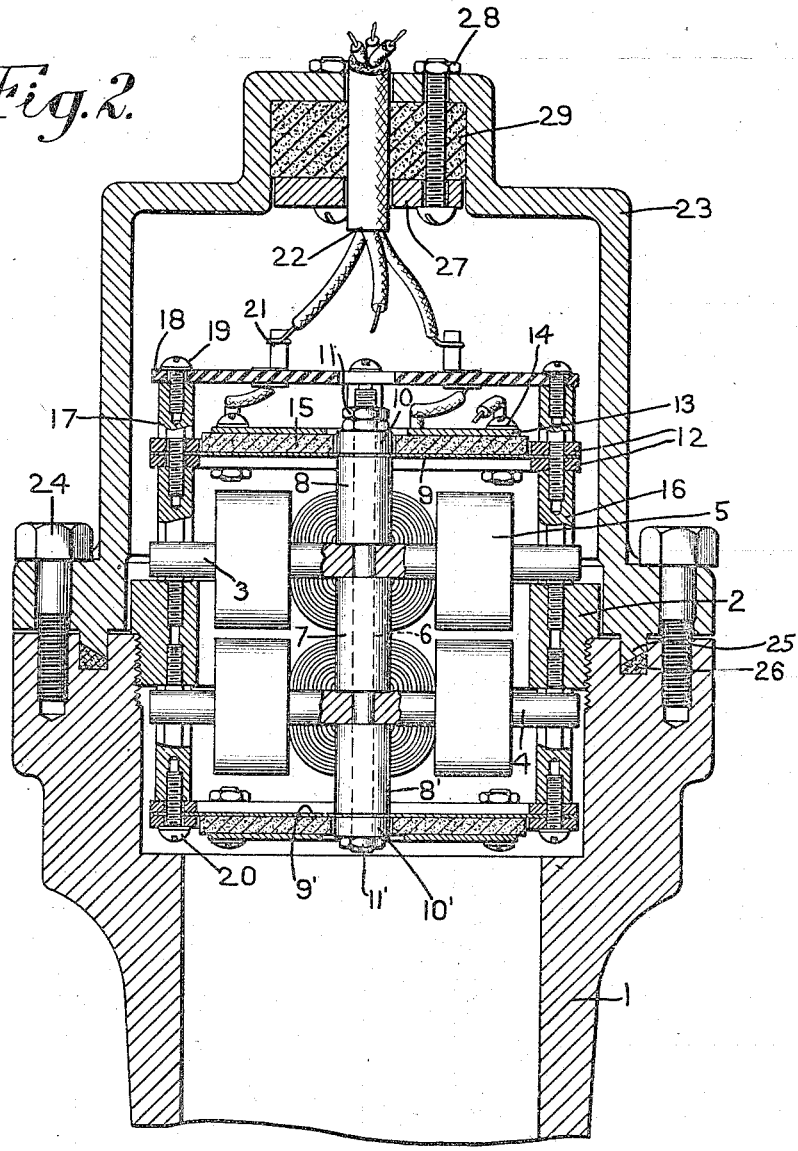

March 20, 1934.                H. C. HAYES                    1,951,358
                            VIBRATION DETECTOR
                          Filed May 17, 1928           3 Sheets-Sheet 3

Inventor
Harvey C. Hayes
By    Attorney

Patented Mar. 20, 1934

1,951,358

UNITED STATES PATENT OFFICE 1,951,358

VIBRATION DETECTOR

Harvey C. Hayes, Washington, D. C.

Application May 17, 1928, Serial No. 278,493

6 Claims. (Cl. 177—352)

(Granted under the act of March 3, 1883, as amended April 30, 1928; 370 O. G. 757)

The present invention relates generally to devices of the character adapted to convert mechanical movements of certain parts into electrical energy or variations in electrical energy. More particularly, the invention has reference to devices capable of translating vibrations produced by sound or similar waves into electrical effects which may be either indicated or recorded. Numerous devices of this general nature have been proposed in the past and have for the most part been based either upon the principles of the microphone or of the magneto-phone. The present invention relates especially to the latter type of device and has for a primary object the provision of a simple and compact construction which is very sensitive, particularly to the reception of vertical vibrations or the vertical components of any vibrations, although it may readily be adapted to the reception of waves from any desired direction.

Within a comparatively recent period considerable work has been done in the way of exploring the earth's surface by the use of compressional waves which may be set up by means of an explosion or by some special sounding device. In connection with work of this character, an extremely important item is the provision of a detector which is sensitive and which is capable of faithfully and accurately producing electrical effects corresponding to the vibrations emitted from a given source and picked up by the detector. It has been found in connection with this type of work that the vertical component of the compressional waves set up is the more important and produces the greatest effect upon the detector at the distances now commonly employed. For this reason the present invention contemplates a device which is particularly sensitive to and suited for the reception and reproduction of vertical components of waves.

With these and incidental objects in view, the invention will now be described in detail with reference to the accompanying drawings in which—

Figure 1:
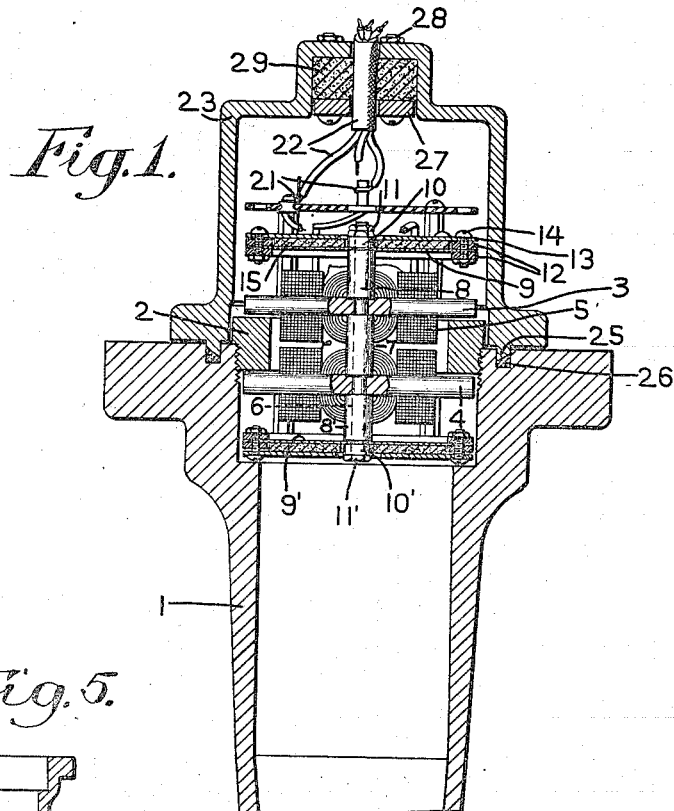
Figure 5:
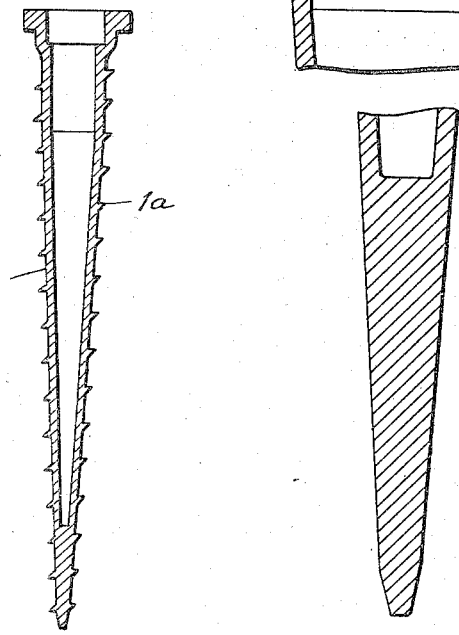
Figure 3:
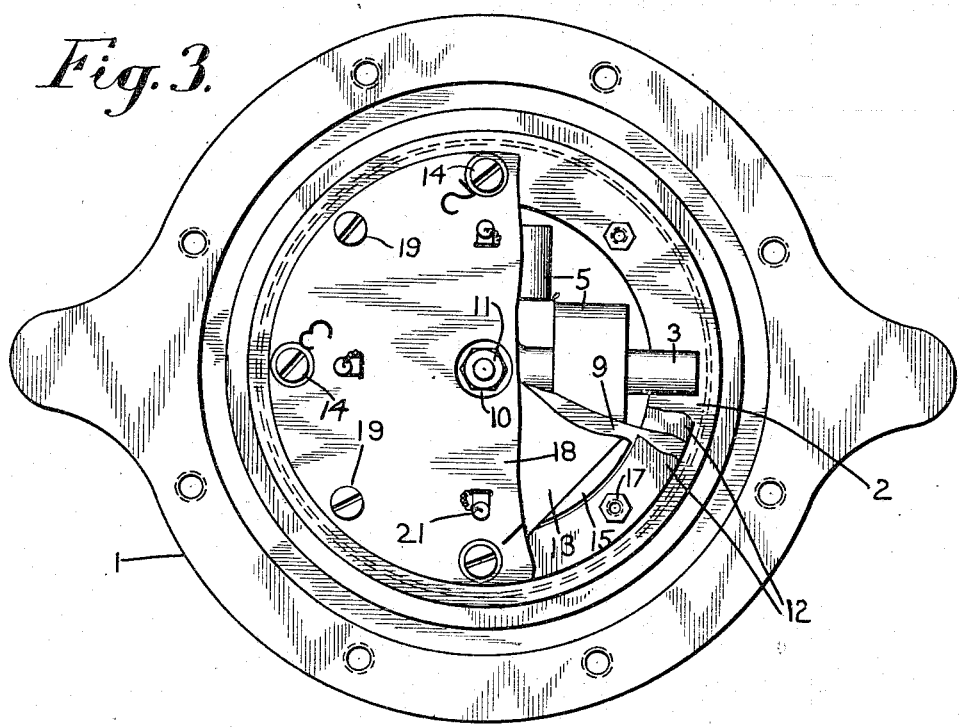
Figure 4:
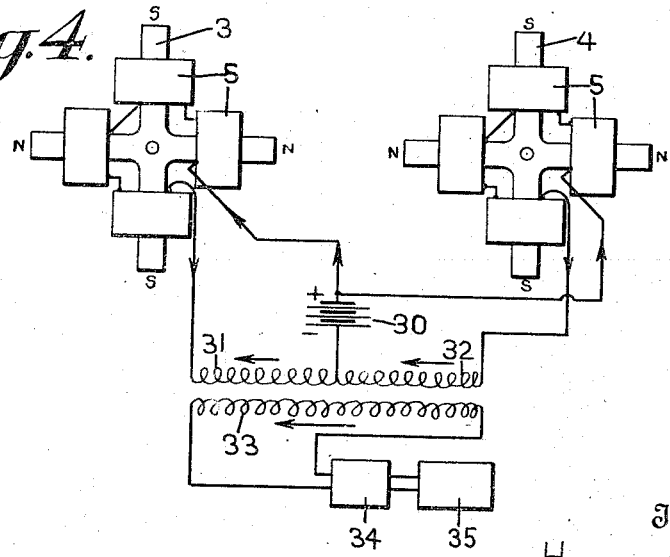

Figure 1 is an assembly elevational view of the improved detector with a portion thereof shown in section, Figure 2 is a similar view of the upper end of the detector on an enlarged scale and taken from a different angle, Figure 3 is a plan view of the device with parts broken away, Figure 4 is a diagrammatic showing of the method of connecting certain coils forming a part of the device, and their relation to other parts of an electrical circuit, and Figure 5 is a sectional view on a reduced scale showing the outer surface of the conical casing provided with a spiral flange.

As is commonly the case with devices of the general character herein disclosed, the present invention contemplates a construction embodying a vibration or wave responsive element which is adapted to be inserted in the ground or other medium to partake of the vibrations transmitted through the latter. An inertia element is mounted in such a relation to the wave responsive element that a relative movement will be produced between the two whenever a vibration or train of waves strikes the device. A magnetic field is set up within the device and suitable coils are arranged within this field in such a way that the flux threading the coils may be varied in accordance with the relative movement between the wave responsive element and the inertia element. Suitable means are then provided for combining the induced effects within the several coils so that the net result may be indicated or recorded.

With this general explanation of the type of device to which the present improvements relate, a preferred embodiment of the invention will now be described in detail.

The wave or vibration responsive element preferably assumes the form of a cone 1 which may be of any suitable dimension and material. In practice it has been found that an aluminum cone about thirty inches in height and tapering from a relatively sharp point to a diameter of four or five inches at its upper end, is very satisfactory. The cone need not be solid but may be provided with a substantial cavity so long as the walls are of sufficient thickness to be rigid and unyielding to the vibrations or waves which strike it. Instead of being conical, the element 1 may, if desired, assume the form of a slender pyramid having long tapering sides. The advantage of the tapered formation is that more intimate contact between the wave responsive element and the soil in which it is inserted is provided. Thus, when the cone or pyramid is forced into the ground, it will serve to pack some of the soil in the immediate neighborhood of the element and will tend to produce a mass at that point, including the earth and the element itself, which will move as a unit in response to the vibrations set up. When used in softer soil such as in swampy land, the flat sided pyramid construction may be found advantageous since the rounded edges of the conical form would present more or less of a stream line effect to the approaching waves, thus losing the force of a good portion of the vibration to be detected. For the better reception of vertical impulses under similar conditions, it may be found advantageous to provide the outer surface of the cone with a spiral flange in the form of a screw thread 1a as is shown in Fig. 5. Such a flange would also aid in the insertion and withdrawal of the device where more solid earth is involved.

In the upper open end of the conical casing 1 there is mounted an annular member or ring 2 formed preferably of iron or any other suitable material having good magnetic qualities. This ring may be secured in the end of the cone by any suitable means and for purposes of illustration, it has been shown as provided with screw threads adapted to fit internal threads within the opening of the cone. An inertia member which may be termed an armature is so mounted with relation to the ring 2 as to provide a plurality of magnetic circuits in which variations in the magnetic flux may be brought about upon relative movements of the ring and armature. This inertia member consists of a pair of cross elements 3 and 4 located respectively above and below the annular ring 2 and formed of any suitable material of good magnetic qualities, such as Norway iron or transformer steel laminations. A coil 5 having any suitable number of turns of wire is mounted upon each arm of each of the crosses, there being eight of these coils in all. A screw-threaded rod 6 is passed through a small opening in each of the cross members 3 and 4 and is adapted to carry a spacing collar 7, which serves to maintain the two crosses at the desired distance apart. This distance is slightly greater than the thickness of the annular member 2 so that a small air gap may be provided between either side of the latter and the adjacent cross. A spacing collar 8 is also mounted on the rod 6 above the cross 3 and serves to maintain a diaphragm 9 at a suitable distance from the cross member 3. This diaphragm may be formed of any suitable resilient material but is preferably made of thin sheet steel, being provided with a small opening at its center to surround the rod 6. A collar 10 above the diaphragm and surrounding the rod 6 may be forced by a pair of nuts 11 against the diaphragm to aid in holding the parts together.

A similar construction including a spacing collar 8', a diaphragm 9', a collar 10', and a nut 11', all mounted upon the rod 6, is provided below the lower cross 4. It will be apparent that by means of the rod 6 and the nuts 11 and 11', all of the elements through which the rod 6 passes are secured together as a single unit.

Around the outer edge of the diaphragm 9 above and below the latter there is provided a plurality of clamping rings 12 formed of any suitable material, such as brass. Above the uppermost of the rings 12 and spaced slightly therefrom, a plate or disk 13, also formed preferably of brass, is provided and this, and the rings 12 and the outer rim of the diaphragm 9, are fastened together by means of a series of bolts 14. Between the disk 13 and the diaphragm 9 a damping washer 15, preferably formed of felt, is mounted and the pressure exerted by the latter against the diaphragm 9 may be regulated by proper adjustment of the bolts 14. A construction similar in all respects to that just described is also provided for the lower diaphragm 9'.

Now for the purpose of supporting the armature unit so as to maintain a normal clearance between the cross members 3 and 4 and the ring 2, a series of posts 16 is provided. These posts at their lower ends are formed with screw-threaded extensions adapted to fit into screw-threaded openings in the ring 2 located at points intermediate the extended arms of the cross members, i. e., along radial lines forming angles of about 45° with these arms. The other ends of the posts 16 are provided with screw-threaded openings which are adapted to receive the screw-threaded extensions of posts 17. The extensions of the latter posts are passed through the rings 12 and the edge of the diaphragm 9, thereby supporting and rigidly holding the outer edge of the diaphragm.

As shown in Figures 2 and 3, the disk 13 is preferably cut away at the points where the posts 17 are located so that the latter need not be passed through this plate and will not interfere with the adjustment of the latter by the bolts 14. A plate 18 of any suitable electrical insulating material, such as a phenolic condensation product may be supported by the posts 17 and fastened to the latter by means of screws 19 threaded into openings in the upper ends of the posts.

Substantially the same construction is provided between the magnetic ring 2 and the diaphragm 9' for supporting the latter at its edge from the ring 2. However, the insulating plate 18 is omitted from the lower end of the unit so that screws 20 may be provided to fasten the rings 12 and the diaphragm in lieu of the posts 17 employed at the upper end.

It will be apparent that by means of the construction described, the armature consisting of the pair of crosses 3 and 4 with their coils and the collars 6, 8 and 8' etc., will be suspended resiliently between the centers of the diaphragms 9 and 9' whose edges are held in fixed relation to the magnetic ring 2. By proper adjustment of the nuts on the screw rod 6 and of the bolts 14, the armature may be made to assume a normal position in which a slight air gap exists between the arms of the two cross members and the upper and lower surfaces of the ring 2. However, upon a movement of the casing 1 and hence the ring 2, a relative movement will be brought about between the latter and the cross members due to the yielding support of the armature afforded by the two diaphragms, 9 and 9'.

As best shown in Figure 4, the four coils 5 on each of the crosses are preferably connected in series, although they may be connected in parallel if so desired or they may be grouped in pairs, the coils of a pair being in series and the two pair in parallel. Furthermore, one of the free ends of a coil on the armature 3 will preferably be connected to one of the free ends of a coil on the armature 4. This leaves only two free ends of the entire series of eight coils, which are then connected by suitable conductors to binding posts 21 mounted on the plate 18. A similar conductor serves to connect a third binding post on the plate 18 to the otherwise free terminals of the two coils, one on the cross 3 and the other on the cross 4, which are connected together as explained above. A suitable three-wire cable 22 having a wire connected to each of the binding posts 21 serves to carry the electrical circuits through a suitable opening in a cap 23 adapted to enclose the entire upper end of the cone. This cap is preferably secured to the cone by means of a series of bolts 24 passing through an annular flange on the cap and into an annular rim formed at the upper end of the cone. In order to provide a water-tight joint between the cap and cone, the latter is provided with an annular groove into which a rubber gasket 26 is inserted and with which an annular rib 25 formed on the under side of the cap cooperates. The upper end of the cap 23 at the point where the cable 22 passes through is also made water-tight by means of a stuffing-box provided between a clamping disk 27 and the upper end of the cap. The clamping disk, which is preferably made of brass, may be held in position by suitable bolts 28 and the space formed between it and the cap is preferably filled by a sealing washer 29 formed of rubber or any suitable packing material.

In order to detect the relative movements between the cross members 3 and 4 and the ring 2 due to vibrations picked up by the casing 1, the three wires of the cable 22 may be connected in any suitable way to a source of electricity and the primary coils of a transformer. For example, the wire which is connected to a coil on each of the crosses may be connected to the positive terminal of a battery 30 or a similar source of electricity, while the remaining wires of the cable 22 may be connected to the ends of two transformer coils 31 and 32. The opposite ends of these two coils may then be connected to the negative terminal of the battery.

This arrangement as shown in Figure 4 is such that the current from the battery 30 traversing the coils 5 will serve to establish two north and two south poles on each of the crosses, like poles on each cross being opposite each other. Furthermore, the cross 3 is so mounted with relation to cross 4 as to place like poles in vertical alignment, although this is not altogether essential. It is to be understood that the coils are wound in such sense and are so mounted on the arms of the crosses that the polarity indicated will result from the passage of the current through the coils in whatever form of connection is adopted between them. Other arrangements of the magnetic poles might be adopted so long as a flux is set up in each of a plurality of circuits between the crosses and the ring 2 so that a variation in the air gaps between these elements will bring about a change in the flux in one or more of the circuits.

Now, if we assume that the device is properly inserted in the ground and a vibration is received which tends to move the casing 1 upwardly, the ring 2 will move upwardly as well. However, due to the inertia of the armature, the two crosses 3 and 4 will remain practically stationary and merely flex the diaphragms 9 and 9' so that the air gap between the ring 2 and cross 3 will be reduced while the air gap between the ring 2 and the cross 4 will be increased. This will result in the generation of an induced current in the coils 5 mounted on the cross 3 in such sense as to oppose the increase in flux brought about by the decrease in the air gap. In other words, this induced current will oppose that flowing from the source 30 and will be in the direction of the arrow indicated above the coil 31. On the other hand, the current induced in the coils on the cross 4 will be in such sense as to oppose the decrease in flux and will be in the same direction as the current from the source 30, as indicated by the arrow above the coil 32. It will be clear, therefore, that these induced currents in the two sets of coils will flow in the same direction through the coils 31 and 32 and will produce a combined effect equal to the changes in the two coils 31 and 32 in the secondary winding 33 of the transformer. The terminals of this secondary winding may be connected to any suitable amplifying unit 34 which in turn may be connected to any suitable form of indicating or recording instrument such as a galvanometer or oscillograph 35 for the purpose of indicating or recording the changes of current brought about by the movements of the casing 1.

While one admirable form of the invention has been disclosed in detail herein, it is to be understood that this constitutes only one illustrative embodiment of the novel features which are capable of many variations. The method of mounting the diaphragms which support the inertia elements in the manner described has the advantage of maintaining all of the structure in the upper end of the cone as a unit assembly about the ring 2 as a main support. By virtue of this construction the entire unit may be inserted in or withdrawn from the casing by merely turning the ring 2 relative to the casing 1. Obviously the invention is not limited to this type of construction, however, and if desired the diaphragms may be carried directly by the conical casing. Many other changes may be effected within the contemplation of the invention and it is desired to be limited only in this respect by the scope of the claims which follow.

The invention herein described may be manufactured and used by or for the Government of the United States for governmental purposes without the payment to me of any royalty thereon or therefor.

What I claim is:

1. In a device of the class described an armature comprising a pair of crosses arranged in parallel planes and secured at their centers, a coil mounted on each arm of each of said crosses, a casing, an element of magnetic material located in a plane parallel to the planes of the crosses and between the arms of said crosses, said element being rigidly secured to said casing, and resilient means for connecting said armature to said casing.

2. In a device of the class described a vibration responsive element, a member of magnetic material secured to said element, resilient means connected to said element, an armature comprising a pair of interconnected crosses arranged in horizontal planes respectively above and below said member, said armature being supported by said resilient means, and means for establishing a magnetic flux through said armature and said member.

3. In a device of the class described a casing adapted to be vibrated, an annular member mounted in said casing for direct movement therewith, an armature comprising a pair of connected cross elements flexibly mounted in said casing, said cross elements being spaced respectively by a small air gap from opposite sides of said annular member, a coil mounted on each arm of each of said cross elements, a source of electricity and connections therefrom for energizing said coils to produce like magnetic poles on the alined arms of different crosses.

4. In a device of the class described a casing adapted to be vibrated, an annular member mounted in said casing for direct movement therewith, an armature comprising a pair of connected cross elements flexibly mounted in said casing, said cross elements being spaced respectively by a small air gap from opposite sides of said annular member, a coil mounted on each arm of each of said cross elements, a source of electricity and connections therefrom for energizing said coils to produce like magnetic poles on opposite arms of each cross.

5. In a device of the class described a casing adapted to receive vibrations, a pair of diaphragms secured in said casing, an inertia member suspended between said diaphragms and supported thereby, said member comprising a plurality of connected elements which are in separate planes, a member of magnetic material secured to said casing and extending between said elements of the inertia member to form therewith magnetic circuits having a plurality of air gaps, and an electrical conductor in the magnetic field adapted to have a current induced therein upon relative movements of said casing and inertia member.

6. In a device of the class described, a vibration responsive element, an annular magnetic conductor rigidly supported by said element, a pair of flexible diaphragms supported at their edges by said element, said diaphragms being mounted at opposite sides of said magnetic conductor, an armature supported from the centers of and between said diaphragms and adapted to form magnetic circuits with said conductor, and an electrical conductor mounted on said armature and adapted to have currents induced therein upon movements of said element.

HARVEY C. HAYES.